UNITED STATES PATENT OFFICE.

WILLIAM H. STANLEY, OF MONTREAL, QUEBEC, CANADA.

COLORING AND PARTING MATERIAL FOR DENTAL IMPRESSIONS AND MOLDS.

1,349,013. Specification of Letters Patent. Patented Aug. 10, 1920.

No Drawing. Application filed December 6, 1919. Serial No. 343,116.

*To all whom it may concern:*

Be it known that I, WILLIAM H. STANLEY, a subject of the King of Great Britain, and resident of the city of Montreal, in the Province of Quebec and Dominion of Canada, have invented certain new and useful Improvements in Coloring and Parting Material for Dental Impressions and Molds, of which the following is a full, clear, and exact description.

This invention relates to improvements in a composition of matter for coloring dental impressions, molds, models and the like, and also to serve as a parting material to facilitate separation of the impression and model, etc.

According to this invention the composition of matter is made in two parts which are mixed together and applied to the surface of the plaster impression to facilitate the separation of same from the plaster model to be made from the impression, and also to enable the mechanic to distinguish the impression from the model in chipping out the impression.

Part 1 of the mixture consists of washing soda, sodium chlorid and water. The washing soda being in approximately the proportion of 2 oz. to 2 qts. (imperial) of water. The soda is placed in cold water, brought to a boil and then boiled for a few minutes. Approximately a quarter of an ounce of sodium chlorid added and the mixture allowed to cool. Part 2 consists of shellac and wood alcohol in approximately the proportion of 1 lb. of dry shellac to 2 qts. (imperial) of wood alcohol. The shellac is cut in the alcohol in the usual manner. These two solutions are mixed together in approximately the proportions of 1 qt. (imperial) of part 2 to 3 qts. (imperial) of part 1 when cold and thoroughly stirred, whereupon, a slight reaction occurs and a deep reddish purple or reddish brown cloudy mixture results, upon which a scum gathers. The mixture is then carefully strained and filtered and a clear liquid of dark reddish purple or reddish brown color results. This mixture is entirely stable and may be kept indefinitely if properly protected from light and air as by storing in brown glass bottles.

The mixture is used preferably by dipping the plaster impression into it but if desired the mixture may be painted onto the plaster impression. A few minutes are allowed for the mixture to penetrate the dry plaster and the surplus is then washed off with water. The impression is preferably kept under water until the moment when the plaster of the model is to be poured on it. The plaster, which is impregnated with the mixture, is colored a reddish purple and is so hard and smooth that it may be rubbed briskly with the hand without any trace of plaster adhering to the skin. The liquid is about the consistency of water and there is no appreciable coating on the surface of the plaster impression so that there is absolutely no change made in the surface and the most minute details of the rugæ or other original surface formation are preserved with absolute accuracy. It will thus be seen that with this mixture there is no danger of obliterating the smaller details of the impression as is frequently done when the impression is varnished. The model taken from an impression treated with this mixture is perfect in every detail and has the same smooth surface as the treated impression. An impression treated with this mixture will separate perfectly from the model which is poured in it. Owing to the consistency of the mixture it penetrates some distance into the impression so that the mechanic, when cutting out the impression, will observe the coloration before coming so near to the surface that there is danger of cutting through the impression into the model.

Having thus described my invention, what I claim is;—

1. A combined coloring and parting material for plaster impressions which comprises water, washing soda, shellac and alcohol.

2. A mixture according to claim 1, containing sodium chlorid.

3. A mixture according to claim 1, in which the soda and water are approximately in the proportions of 2 oz. of soda to 2 qts. (imperial) of water.

4. A parting and coloring material for plaster work comprising a mixture of an aqueous solution of washing soda and salt with an alcoholic solution of shellac.

5. A mixture according to claim 4, in which the aqueous solution is in approximately the proportions of 2 oz. of soda and a quarter of an ounce of salt to 3 qts. (imperial) of water, and the shellac solution in the proportion of 1 lb. of dry shellac to 2 qts. (imperial) of water, the aqueous and alcoholic solution being mixed in approximately the proportion of 3 parts of aqueous solution to 1 part of alcoholic solution by measure.

6. A method of preparing coloring and parting solutions which comprises boiling washing soda in water, adding salt to the solution and after cooling mixing with the aqueous solution an alcoholic solution of shellac.

7. In combination with a method according to claim 6, the additional step of removing solid matter in suspension in the liquid.

In witness whereof, I have hereunto set my hand.

WILLIAM H. STANLEY.